United States Patent [19]

Blackman et al.

[11] Patent Number: 5,761,671
[45] Date of Patent: Jun. 2, 1998

[54] METHOD FOR INTERFACING QUERYABLE DATESTORE PERSISTENT OBJECTS TO NON-RELATIONAL, NON-OBJECT-ORIENTED DATASTORES

[75] Inventors: Kenneth R. Blackman, San Jose; Jack L. Howe, III, Gilroy, both of Calif.

[73] Assignee: International Business Machines Corporation, Armonk, N.Y.

[21] Appl. No.: 736,983

[22] Filed: Oct. 25, 1996

[51] Int. Cl.$^6$ .................................................. G06F 17/30
[52] U.S. Cl. ........................... 707/103; 707/101; 707/102
[58] Field of Search ........................... 707/100, 101, 707/103, 102; 395/500

[56] References Cited

U.S. PATENT DOCUMENTS

| | | | |
|---|---|---|---|
| 5,161,225 | 11/1992 | Abraham et al. | 707/103 |
| 5,212,787 | 5/1993 | Baker et al. | 707/101 |
| 5,291,583 | 3/1994 | Bapat | 395/500 |
| 5,295,256 | 3/1994 | Bapat | 395/500 |
| 5,297,279 | 3/1994 | Bannon et al. | 707/103 |
| 5,303,379 | 4/1994 | Khoyi et al. | 395/710 |
| 5,414,812 | 5/1995 | Filip et al. | 707/103 |
| 5,421,015 | 5/1995 | Khoyi et al. | 395/677 |
| 5,426,747 | 6/1995 | Weinreb et al. | 395/413 |
| 5,437,027 | 7/1995 | Bannon et al. | 707/103 |
| 5,459,860 | 10/1995 | Burnett et al. | 707/101 |
| 5,499,371 | 3/1996 | Henninger et al. | 395/702 |
| 5,542,078 | 7/1996 | Martel et al. | 707/101 |

OTHER PUBLICATIONS

Kenneth J. Muckenhaupt, "Preserving Current Assets With Objects on MVS White Paper", Mar. 15, 1996, 21 pages, at http://www.s390.ibm.com/products/wp/wrapwp.html.

1. "IMS in an Object Oriented World", IBM Corporation, San Jose, CA, Jul. 12, 1995, pp. 1–53.

2. Inventor Jack L. Howe, III, IMS/OO—Overview: Objects in IMS Are Closer Than They Appear, IBM Corporation, overheads from presentation at SHARE 95, Feb. 23, 1995, (see entire document).

3. Inventor Jack L. Howe, III, "Objects in the IMS are Closer Than They Apear", IBM Corporation, overheads from presentation at IBM Technical Interchange '95, May 20, 1995, (see entire document).

4. "Voyager/C++ Client/Server Object Management System", Secant Technologies Inc., 1995, (see entire document).

Primary Examiner—Paul V. Kulik
Attorney, Agent, or Firm—Merchant, Gould, Smith, Edell, Welter, & Schmidt

[57] ABSTRACT

A method, apparatus, and article of manufacture for interfacing queryable datastore persistent objects to non-relational, non-object-oriented datastores. A computerized system in accordance with the principles of the present invention includes a "bridge" for receiving a request to access a datastore persistent object stored, for retrieving a logical unit of data from the external non-object-oriented datastore in response to the request, and for populating the datastore persistent object with the logical unit of data retrieved from the external non-object-oriented datastore, so that the logical unit of data is encapsulated within the datastore persistent object.

27 Claims, 6 Drawing Sheets

METHOD FOR INTERFACING QUERYABLE DATESTORE PERSISTENT OBJECTS TO NON-RELATIONAL, NON-OBJECT-ORIENTED DATASTORES

CROSS-REFERENCE TO RELATED APPLICATIONS

This application is related to the following co-pending and commonly-assigned patent applications:

Application Ser. No. 08,736,762, entitled "A FRAMEWORK FOR OBJECT-ORIENTED ACCESS TO NON-OBJECT-ORIENTED DATASTORES," filed on same date herewith, by Kenneth R. Blackman and Jack L. Howe III;

Application Ser. No. 08,736,763, entitled "A METHOD FOR REPRESENTING NON-OBJECT-ORIENTED DATASTORES USING A COLLECTION OF COLLECTIONS DATA MODEL," filed on same date herewith, by Kenneth R. Blackman and Jack L. Howe III;

Application Ser. No. 08,738,294, entitled "A METHOD FOR THE INCREMENTAL PRESENTATION OF NON-OBJECT-ORIENTED DATASTORES USING AN OBJECT-ORIENTED QUERYABLE DATASTORE COLLECTION," filed on same date herewith, by Kenneth R. Blackman and Jack L. Howe III;

Application Ser. No. 08,738,104, entitled "A QUERY SYNTAX FOR ACCESSING NON-RELATIONAL, NON-OBJECT-ORIENTED DATASTORES," filed on same date herewith, by Kenneth R. Blackman and Jack L. Howe III;

Application Ser. No. 08,738,082, entitled "A QUERY PARSER FOR ACCESSING NON-RELATIONAL, NON-OBJECT-ORIENTED DATASTORES," filed on same date herewith, by Kenneth R. Blackman and Jack L. Howe III;

Application Ser. No. 08,738,330, entitled "A METHOD FOR USING A DATASTORE CURSOR FOR THE INCREMENTAL PRESENTATION OF QUERY RESULTS WHEN TRAVERSING IMPLIED COLLECTIONS IN NON-OBJECT-ORIENTED DATASTORES," filed on same date herewith, by Kenneth R. Blackman and Jack L. Howe III;

Application Ser. No. 08,736,759, entitled "A METHOD FOR REPRESENTING DATA FROM NON-RELATIONAL, NON-OBJECT-ORIENTED DATASTORES AS QUERYABLE DATASTORE PERSISTENT OBJECTS," filed on same date herewith, by Kenneth R. Blackman and Jack L. Howe III;

Application Ser. No. 08,736,764, entitled "A METHOD FOR ENCAPSULATING DATA FROM NON-OBJECT-ORIENTED DATASTORES AS DATASTORE PERSISTENT OBJECTS," filed on same date herewith, by Kenneth R. Blackman and Jack L. Howe III;

Application Ser. No. 08,738,103, entitled "A METHOD FOR USING QUERYABLE PERSISTENT IDENTIFIERS TO LOCATE DATA FOR DATASTORE PERSISTENT OBJECTS IN NON-OBJECT-ORIENTED DATASTORES," filed on same date herewith, by Kenneth R. Blackman and Jack L. Howe III;

Application Ser. No. 08,736,952, entitled "A METHOD FOR MANAGING QUERYABLE DATASTORE PERSISTENT OBJECTS AND QUERYABLE DATASTORE COLLECTIONS IN AN OBJECT-ORIENTED ENVIRONMENT," filed on same date herewith, by Kenneth R. Blackman and Jack L. Howe III;

Application Ser. No. 08,736,765, entitled "A METHOD FOR CATALOGING DATASTORE CHARACTERISTICS AND DEFINING AND GENERATING DATASTORE PERSISTENT OBJECTS," filed on same date herewith, by Kenneth R. Blackman and Jack L. Howe III;

Application Ser. No. 08,738,102, entitled "A METHOD FOR CAPTURING AND CATALOGING SPECIFICATIONS FOR DATASTORE PERSISTENT CLASSES," filed on same date herewith, by Kenneth R. Blackman and Jack L. Howe III;

Application Ser. No. 08,736,761, entitled "A METHOD FOR CAPTURING AND CATALOGING PROGRAM CHARACTERISTICS FOR THE USAGE OF DATASTORE PERSISTENT CLASSES," filed on same date herewith, by Kenneth R. Blackman and Jack L. Howe III; and Application Ser. No. 08,738,105, entitled "A METHOD FOR USING A NON-OBJECT-ORIENTED DATASTORE AS A GENERIC PERSISTENT DATASTORE FOR PERSISTENT OBJECTS," filed on same date herewith, by Kenneth R. Blackman and Jack L. Howe III;

all of which applications are incorporated by reference herein.

BACKGROUND OF THE INVENTION

1. Field of the Invention

The present invention relates generally to computerized methods for accessing datastores, and in particular, to a computerized object-oriented method for accessing non-object-oriented datastores.

2. Description of Related Art

It is well known in the art to use database management systems, such as IBM's IMS™ (Information Management System) database management system, to manage computerized datastores. Indeed, IMS™ has been used for decades and remains in use today. Currently, there is a need to access such "legacy" datastores using application programs developed by object-oriented programming systems (OOPS). However, there are few tools available to assist OOPS programmers.

One method for allowing object-oriented application programs to access data in an IMS™ datastore is through transaction wrappering, implemented in such products such as IBM's VisualAge™ IMS Connection product. Transaction wrappering creates a class having methods that retrieve data from the IMS™ datastore, create an object embodying the retrieved data, and manipulate the object in an object-oriented application program. The problem with this approach is that each object-oriented application requires substantial additional coding, both object-oriented and non-object-oriented, before it is able to access the data in the IMS™ datastore.

Another approach to accessing data in a non-relational, non-object-oriented datastore is to translate the non-relational datastore to a relational datastore, and use existing object-oriented programming techniques developed for relational datastores to access the data therein. The problem with this approach is that non-relational data, such as the hierarchical data found in an IMS™ datastore, does not map well to a relational datastore.

Thus, there is a need in the art for improved techniques for bridging between non-object-oriented datastores and object-oriented application programs.

SUMMARY OF THE INVENTION

To overcome the limitations in the prior art described above, and to overcome other limitations that will become apparent upon reading and understanding the present specification, the present invention discloses a method, apparatus, and article of manufacture for interfacing queryable datastore persistent objects to non-relational, non-object-oriented datastores. A computerized system in accordance with the principles of the present invention includes a "bridge" for receiving a request to access a datastore persistent object stored, for retrieving a logical unit of data from the external non-object-oriented datastore in response to the request, and for populating the datastore persistent object with the logical unit of data retrieved from the external non-object-oriented datastore, so that the logical unit of data is encapsulated within the datastore persistent object.

Various advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention interfaces queryable datastore persistent objects to non-relational, non-object-oriented datastores. A computerized system in accordance with the principles of the present invention includes a "bridge" for receiving a request to access a datastore persistent object stored, for retrieving a logical unit of data from the external non-object-oriented datastore in response to the request, and for populating the datastore persistent object with the logical unit of data retrieved from the external non-object-oriented datastore, so that the logical unit of data is encapsulated within the datastore persistent object.

Hardware Environment

Figure 1:
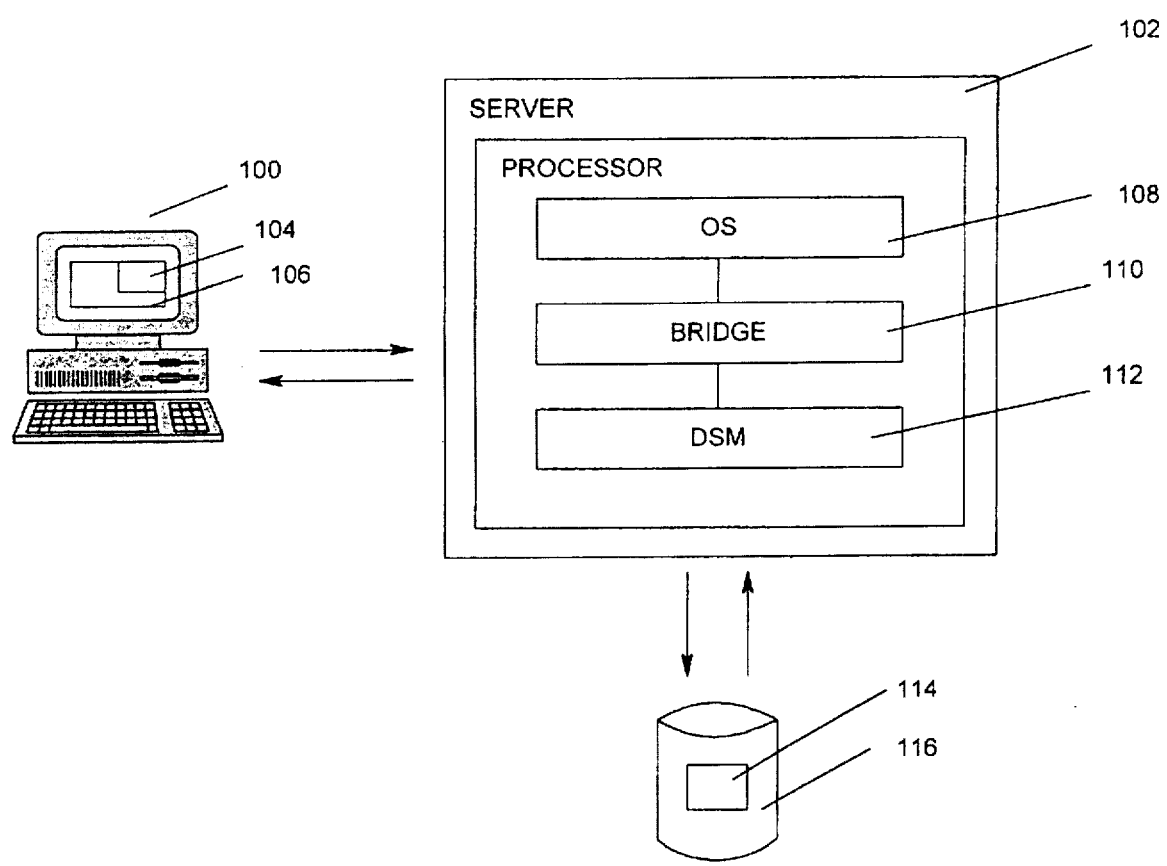
FIG. 1 is a block diagram illustrating an exemplary hardware environment used to implement the preferred embodiment of the invention.

FIG. 1 is a block diagram illustrating an exemplary hardware environment used to implement the preferred embodiment of the invention. A workstation or terminal 100 communicates with a server computer 102. Both the workstation 100 and the server computer 102 are typically comprised of one or more processors, random access memory (RAM), read-only memory (ROM), and other components such data storage devices and data communications devices.

The workstation 100 executes one or more computer programs 104 operating under the control of an operating system 106, such as the MVS™, VM™, AIX™, OS/2™, Windows™, Macintosh™, AS/400™, or UNIX™ operating systems. These computer programs 104 transmit commands to the server computer 102 for performing various functions and receive data from the server computer 102 in response to the commands.

The server computer 102 also operates under the control of an operating system 108, such as the MVS™, VM™, AIX™, OS/2™, Windows™, Macintosh™, AS/400™, or UNIX™ operating systems. The server computer 102 executes one or more computer programs 110 and 112 under the control of the operating system 108. These computer programs 110 and 112 receive commands from the workstation 100 for performing various functions and transmit data to the workstations 100 in response to the commands.

The server computer 102 manages one or more external databases or datastores 114 stored on one or more data storage devices 116 (such as a fixed or hard disk drive, a floppy disk drive, a CD-ROM drive, a tape drive, or other device). In the preferred embodiment, the external datastore 114 comprises an IMS™ datastore managed by an IMS™ database management system (DBMS) product offered by IBM Corporation. Those skilled in the art will recognize, however, that the present invention may be applied to any datastore and associated database management system.

The present invention is generally implemented using five major components executed by the workstation 100 and the server computer 102, i.e., object-oriented application program 104, workstation operating system 106, server operating system 108, bridge 110, and datastore manager (DSM) 112, wherein each of these components comprise one or more computer programs. The object-oriented application program 104 performs application functions; the workstation operating system 106 controls the operation of the workstation 100; the server operating system 108 controls the operation of the server computer 102; the bridge 110 materializes data retrieved from the external database 114 as objects; and the datastore manager 112 controls access to the external database 114.

Generally, these computer programs 104–112 are all tangibly embodied in or retrievable from a computer-readable medium, e.g., a data storage device or a data communications device. Moreover, the computer programs are all comprised of instructions which, when read and executed by the workstation 100 and/or server computer 102, causes the workstation 100 and/or server computer 102 to perform the steps necessary to implement and/or use the present invention.

Those skilled in the art will recognize that any combination of the above components, or any number of different components, including computer programs, peripherals, and other devices, may be used to implement the present invention, so long as similar functions are performed thereby.

Datastore Model

Figure 2:
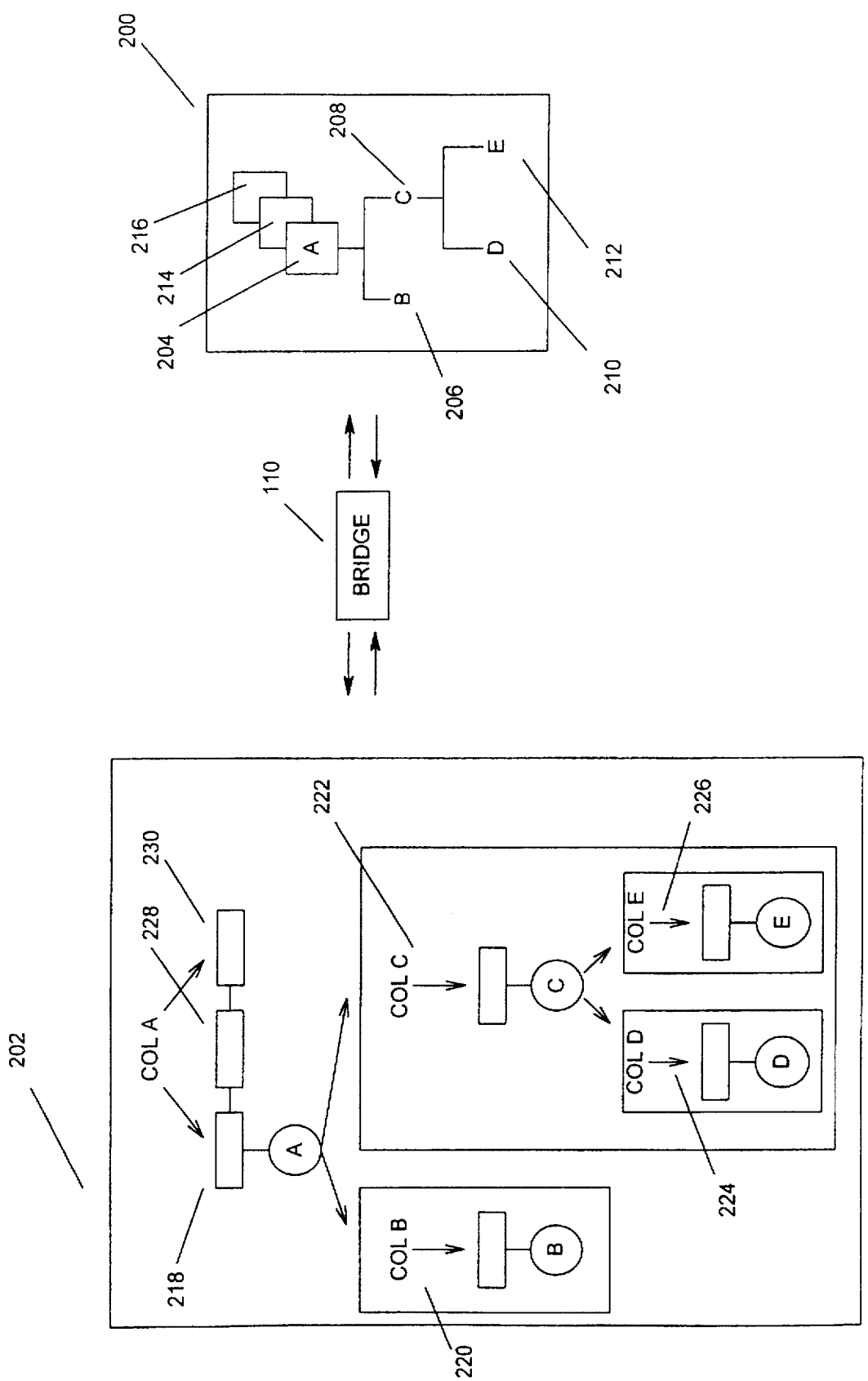
FIG. 2 is a block diagram illustrating the collection of collections data model used in the present invention.

FIG. 2 is a block diagram illustrating the collection of collections data model used in the present invention. Data retrieved from the non-object-oriented external datastore 114 is modeled as a "collection of object collections" in the bridge 110. Where the external data has a simple structure, each record is encapsulated as an object, which becomes a member of an object collection. Where the records are hierarchical in structure, that hierarchical structure is modeled by creating object collections and then hierarchically connecting the related object collections. Other complex logical records can be modeled as a hierarchy of object collections. A single collection of collections is materialized for each datastore, e.g., the object model of two flat files is a model having two collections of collections.

Block 200 represents the logical hierarchical structure of the data as stored in the external datastore 114, and block 202 represents the logical "collection of object collections" structure created from the data retrieved from the external datastore 114. The bridge 110 translates the data between the differing formats and structures in blocks 200 and 202.

In the logical hierarchical structure of block 200, parent record A (204) has children records B (206) and C (208), and child record C (208) is also a parent of children records D (210) and E (212). There may also be multiple instances of parent record A (214 and 216).

Similarly, in the logical "collection of object collections" structure of block 202, parent object A (218) has children objects B (220) and C (222), and child object C (222) is also a parent of children objects D (224) and E (226). Further, there are multiple instances of parent object A (228 and 230). Each of these objects is a datastore persistent object (DPO) that encapsulates a logical unit of data, i.e., record, retrieved from the non-object-oriented datastore, and includes member functions for manipulating the encapsulated data. Thus, the difference between block 200 and 202 is that each record A, B, or C in block 200 is represented by a DPO in block 202, and the hierarchy in block 200 is represented by the collections of object collections in block 202.

Datastore Collection

The bridge 110 manages "datastore collections", which are the foundation of the "collections of object collections" data model. The members of the datastore collection are the DPOs. The datastore collection also includes a query evaluator having a query syntax and a query parser, a queryable datastore cursor, and an associated result collection with a cursor. For complex queries, queries may be sub-divided. Results for the queries are presented in user-specifiable increments, which permits the delivery of large result collections while controlling use of memory.

Figure 3:
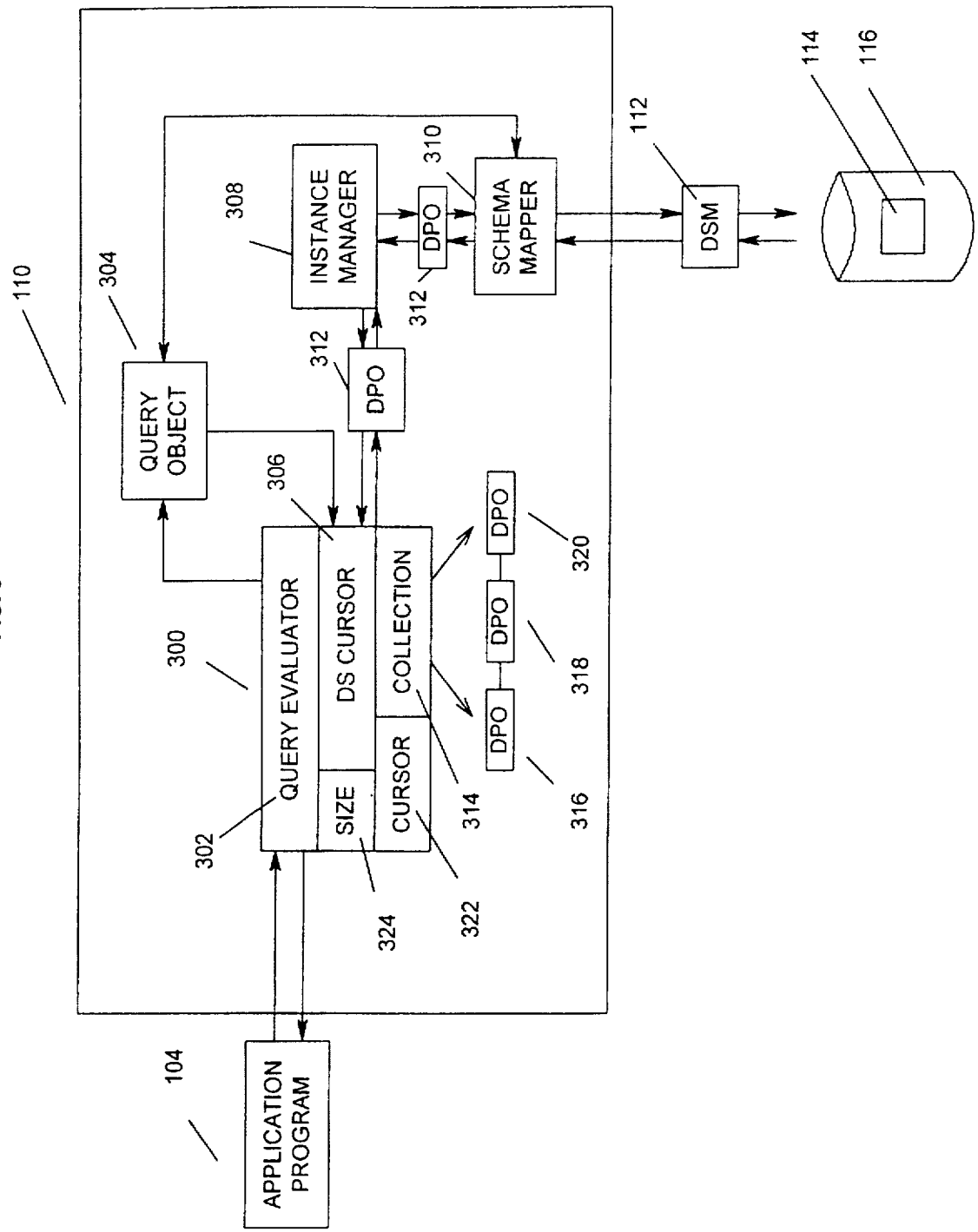
FIG. 3 is a block diagram illustrating an exemplary datastore collection of the bridge according to the present invention.

FIG. 3 is a block diagram illustrating an exemplary datastore collection 300 of the bridge 110 according to the present invention. The datastore collection 300 includes a query evaluator 302 for receiving a query from the application program 104, wherein the query evaluator 302 comprises a query syntax and a query parser. The query evaluator 302 parses the query request in accordance with the query syntax and stores the parsed request in a parse table in a query object 304. A datastore cursor 306 retrieves the parsed query from the query object 304 and provides the parsed query to an instance manager 308, which coordinates requests from the application program 104 with the datastore collection 300 and the external datastore 114. The instance manager 308 uses a schema mapper 310 to interface with the datastore manager 112. The datastore manager 112 retrieves data from the external datastore 114 on the external storage device 116 and returns the requested data to the schema mapper 310. The schema mapper 310 translates common elements between the requested data retrieved from the external datastore 114 and a DPO 312, which results in the requested data being encapsulated in the DPO 312. The schema mapper 310 returns the DPO 312 through the instance manager 308 to the datastore cursor 306 which stores the DPO 312 in the result collection 314. Generally, the result collection 314 comprises one or more DPOs 316, 318, and 320.

The datastore cursor 306 populates the result collection 314 so that the application program 104 can incrementally access the query result. Because the number of data items or records requested by the query may be large, the datastore cursor 306 only populates the result collection 314 with a specified number of DPOs 316, 318, and 320 that correspond to the query request. A pointer to the current DPOs 316, 318, or 320 is maintained by the cursor 322 and the size of the result collection 314 is determined by a size variable 324.

If the application program 104 needs to access more data items or records that satisfy the query, the datastore cursor 306 deletes one or more of the DPOs 316, 318, and 320 from the result collection 314 and requests the instance manager 308, through the schema mapper 310, to retrieve additional DPOs 312, up to the number indicated in the size variable 324 into the result collection 314.

In addition to populating a DPO 312 with data from the external datastore 114, the schema mapper 310 updates the external datastore 114 with changed data from the DPO 312. The schema mapper 310 may add data to the external datastore 114 when a new DPO 312 is created, and the schema mapper 310 may delete corresponding data from the external datastore 114 when a existing DPO 312 is deleted.

The schema mapper 310 translates queries to specific instructions for the datastore manager 112. Generally, these instructions comprise: SELECT, UPDATE, INSERT and DELETE, wherein the SELECT instruction retrieves data from the external datastore 114 via the datastore manager 112 for a DPO 312; the UPDATE instruction, following a SELECT, saves changed data from the DPO 312 into the external datastore 114 via the datastore manager 112; the INSERT instruction saves new data from the DPO 312 into the external datastore 114 via the datastore manager 112; and the DELETE instruction deletes the DPO 312 and its corresponding data from the external datastore 114 via the datastore manager 112.

Datastore Persistent Objects (DPOs)

The members, or elements, of the datastore collection 300 are queryable DPOs 316, 318, and 320 that encapsulate external data, i.e., records retrieved from the external datastore 114, with associated methods to move data with data type integrity between the DPOs 316, 318, and 320, and the records of the external datastore 114. Thus, a DPO 316, 318, and 320 makes non-object-oriented data accessible as "base class objects" that may be used or wrappered by other classes in an object-oriented programming system. Further, the data being encapsulated by the DPO 316, 318, and 320 may or may not be concurrently shared or updated between object-oriented and non-object-oriented applications, depending on the characteristics of the underlying datastore 114.

The bridge 110 thus comprises a queryable persistence implementation that can be used to access data in nonobject-oriented datastores 114. The bridge 110 provides a datastore persistent object class to wrapper data retrieved from the external datastore 114, a queryable persistent identifier (PID) used to specify information used to locate the data in the external datastore 114 needed to populate the particular DPO 312, and a schema mapper class used to obtain the required data from the external datastore 114 and translate or transfer it into the format of the particular DPO 312.

Figure 4:
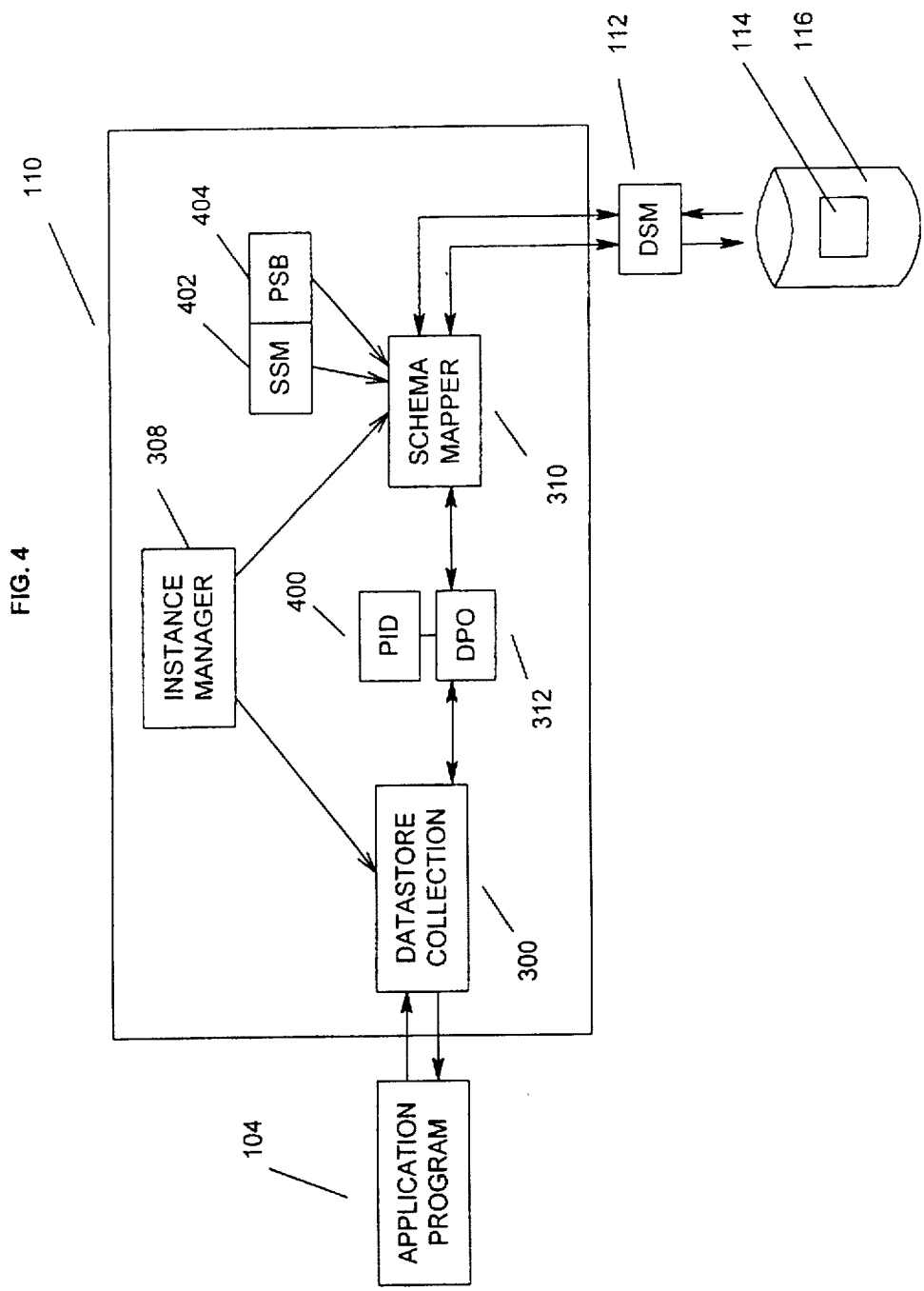
FIG. 4 is a block diagram illustrating the operation of the bridge according to the present invention.

FIG. 4 is a block diagram illustrating the operation of the bridge 110 according to the present invention. The application program 104 passes a query request to the datastore collection 300. The datastore collection 300 evaluates the query and passes control to the datastore cursor 306 for processing. The datastore cursor 306 creates a DPO 312 and its associated DIP 400. The DIP 400 is used to specify the query information needed to locate the data in the external datastore 114.

The DPO 312 and DIP 400 are passed to the instance manager 308 who requests that the schema mapper 310 retrieve the data via the datastore manager 112 for storing into the DPO 312. The schema mapper 310 looks at the DPO's 312 accompanying DIP 400 which has information from the query object 304 for locating data. The schema mapper 310 provides the input/output commands to the datastore manager 112 using information from a subschema mapper 402 and program specification block (PSB) 404. The schema mapper 310 receives the located logical unit of data from the datastore manager 112 and maps the located data into the DPO 312, thereby "wrappering" the logical unit of data. Upon completion of the operation, the DPO 312 then encapsulates the data retrieved by the schema mapper 310.

Persistent Identifier (PID)

Figure 5:
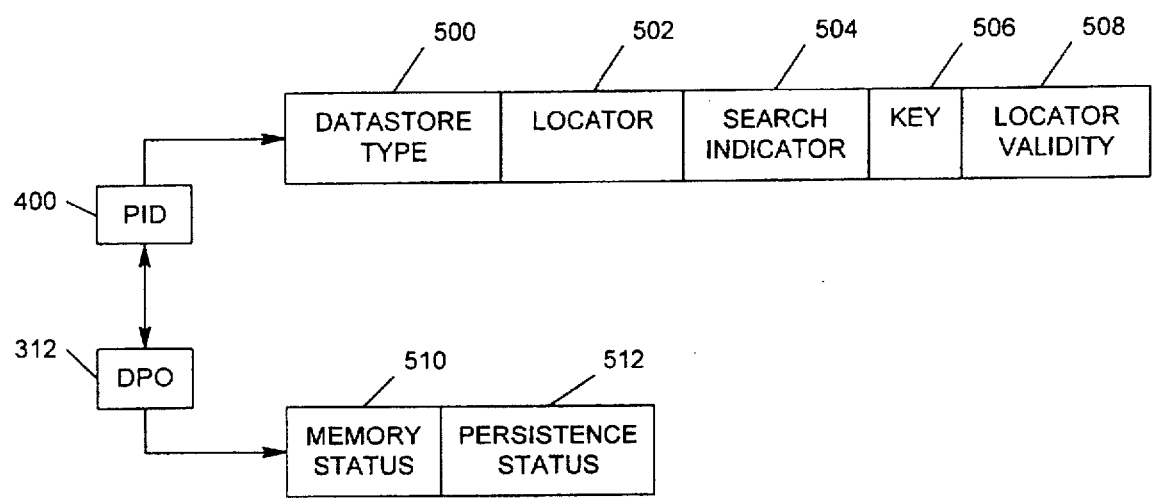
FIG. 5 is a block diagram illustrating the structure and relationship between a datastore persistent object and its persistent identifier (PID) according to the present invention.

FIG. 5 is a block diagram illustrating the structure and relationship between a DPO 312 and its DIP 400 according to the present invention, wherein the DIP 400 has fields for storing the datastore type 500, locator 502, search indicator 504, key 506, and locator validity 508, and the DPO 312 has a memory status 510 and a persistence status 512.

The datastore type field 500 indicates the datastore type, e.g., IMS™, VSAM™, etc. The locator field 502 stores the relevant query information from the query object 304. The search indicator field 504 indicates the method of retrieving additional DPOs, i.e., a FIRST, NEXT, or KEY retrieval, wherein a FIRST or NEXT retrieves additional datastore persistent objects through the locator field 502 and a KEY indicates that a single instance will be retrieved through the key field 506. The key field 506 stores the key to be used to locate data. The locator validity field 508 indicates whether the locator field 502 and key field 506 have been validated by the datastore manager 112.

The memory status 510 is either active, indicating that data from the external datastore 114 has been materialized in the DPO 312, or passive, indicating that the DPO 312 contains no such data. The persistence status 512 is a relative comparison of the data contained in the DPO 312 and the external datastore 114, indicating whether the data has been changed or not within the DPO 312.

Instance Manager

Figure 6:
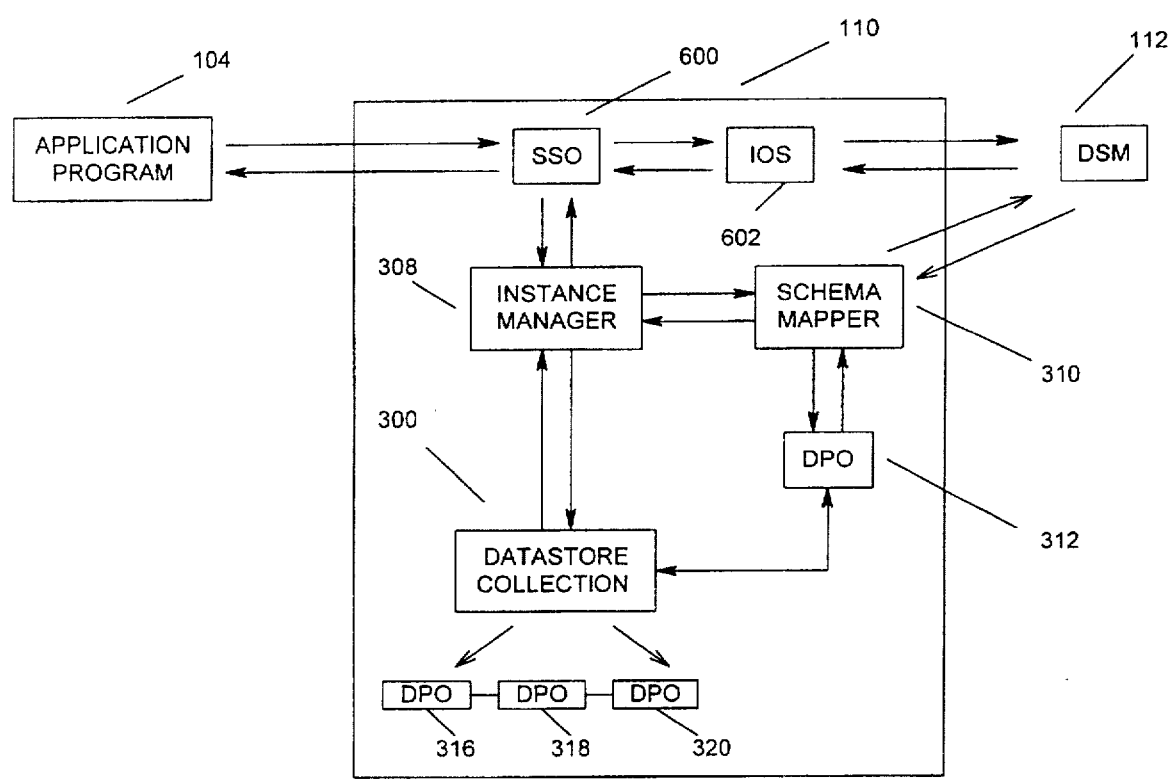
FIG. 6 is a block diagram illustrating the operation of the instance manager according to the present invention.

FIG. 6 is a block diagram illustrating the operation of the instance manager 308 according to the present invention.

In the run-time environment, the datastore collections 300 and DPOs 316, 318, and 320 are managed (e.g., created, tracked, materialized, destroyed, and garbage collected) by the instance manager 308. The instance manager 308 also participates in the unit-of-work between the application program 104 being served and the external datastore 114.

Although the interface to the application program 104 remains constant, the level of service provided by the instance manager 308 will vary according to the characteristics of the external datastore 114. The instance manager 308 will exploit the capabilities of the external datastore 114 and the datastore manager 112 wherever possible, e.g., with regard to query functions, concurrency, security, etc.

The instance manager 308 uses service classes to isolate some of its functions, system services object (SSO) 600, interface object services (IOS) 602, and subschema mapper 402. The SSO 600 serves as a "factory" for creating DPO 312 and datastore collections 300 requested by query objects 304. The SSO 600 further serves as a transaction manager for the unit-of-work.

The SSO 600 receives a unit-of-work request from the application program 104. The SSO 600 creates a subschema mapper 402 and opens a PSB 404 for the unit-of-work request. The SSO 600 interfaces to the datastore manager 112 through the IOS. The IOS 602 opens and closes the connection to the datastore manager 112.

Using the schema mapper 310 the instance manager 308 populates the datastore collection 300 with DPOs 316, 318, and 320 that encapsulate data retrieved from the external datastore 114 via the datastore manager 112. The schema mapper 310 updates the external datastore 114 with changed data from the DPOs 316, 318, and 320, and adds or deletes the associated elements from the external datastore 114 when the DPOs 316, 318, and 320 are added or deleted.

The SSO 600 propagates a request to complete a unit-of-work to the instance manager 308, the datastore collection 300, the schema mapper 310 and the DPOs 316, 318, and 320, so as to coordinate the requests with the datastore manager 112 to maintain the integrity of the external datastore 114. Upon completion of the unit-of-work, the instance manager 308 deletes the DPOs 316, 318 and 320, the datastore collection 300, and schema mapper 310, from the memory of the server computer 102.

Conclusion

This concludes the description of the preferred embodiment of the invention. The following paragraphs describe some alternative methods of accomplishing the same objects.

In alternative embodiments of the present invention, other types and configurations of computers could be used. For example, the invention need not be restricted to client-server configurations. In addition, mainframes, minicomputers, or personal computers, could be used with the present invention.

In alternative embodiments of the present invention, other types and configurations of computer programs could be used. For example, the invention need not be restricted to client-server configurations.

In alternative embodiments of the present invention, other database management systems could be used. For example, the invention need not be restricted to IMS™ database management systems. In addition, the present invention could be used to model other types of information.

In summary, a method, apparatus and article of manufacture for interfacing queryable datastore persistent objects to non-relational, non-object-oriented datastores has been described. A computerized system in accordance with the principles of the present invention includes a "bridge" for receiving a request to access a datastore persistent object stored, for retrieving a logical unit of data from the external non-object-oriented datastore in response to the request, and for populating the datastore persistent object with the logical unit of data retrieved from the external non-object-oriented datastore, so that the logical unit of data is encapsulated within the datastore persistent object.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computerized method for interfacing queryable datastore persistent objects to non-relational, non-object-oriented datastores, comprising the steps of:

receiving a request to access a datastore persistent object stored in a memory of a computer;

retrieving a logical unit of data from an external non-object-oriented datastore stored on a data storage device attached to a computer in response to the request; and populating the datastore persistent object with the logical unit of data retrieved from the external non-object-oriented datastore, so that the logical unit of data is encapsulated within the datastore persistent object in the memory of the computer.

2. The method of claim 1, wherein the populating step comprises the step of translating common elements between the logical unit of data retrieved from the external non-object-oriented datastore and the datastore persistent object.

3. The method of claim 1, further comprising the step of updating the external non-object-oriented datastore when the logical unit of data encapsulated by the datastore persistent object is modified.

4. The method of claim 1, further comprising the step of inserting the logical unit of data encapsulated within the datastore persistent object into the external non-object-oriented datastore.

5. The method of claim 1, further comprising the step of deleting the logical unit of data from the external non-object-oriented datastore when the datastore persistent object is deleted from the memory of the computer.

6. The method of claim 1, wherein the populating step is performed by a schema mapper.

7. The method of claim 6, wherein the datastore persistent object is uniquely associated with a schema mapper.

8. The method of claim 6, wherein the schema mapper stores information concerning the external non-object-oriented datastore selected from a group comprising file names, database names, segment names, and field names.

9. The method of claim 6, wherein the schema mapper translates queries to specific instructions for a datastore manager for the external non-object-oriented datastore, wherein the instructions are selected from a group comprising a select instruction, an insert instruction, an update instruction, and a delete instruction.

10. A computerized apparatus for interfacing queryable datastore persistent objects to non-relational, non-object-oriented datastores, comprising:

an external non-object-oriented datastore stored on a data storage device attached to a computer; and a bridge program, executed by a computer, for receiving a request to access a datastore persistent object stored in a memory of a computer, for retrieving a logical unit of data from the external non-object-oriented datastore in response to the request, and for populating the datastore persistent object with the logical unit of data retrieved from the external non-object-oriented datastore, so that the logical unit of data is encapsulated within the datastore persistent object in the memory of the computer.

11. The apparatus of claim 10, wherein the bridge program further comprises means for translating common elements between the logical unit of data retrieved from the external non-object-oriented datastore and the datastore persistent object.

12. The apparatus of claim 10, wherein the bridge program further comprises means for updating the external non-object-oriented datastore when the logical unit of data encapsulated by the datastore persistent object is modified.

13. The apparatus of claim 10, wherein the bridge program further comprises means for inserting the logical unit of data encapsulated within the datastore persistent object into the external non-object-oriented datastore.

14. The apparatus of claim 10, wherein the bridge program further comprises means for deleting the logical unit of data from the external non-object-oriented datastore when the datastore persistent object is deleted from the memory of the computer.

15. The apparatus of claim 10, wherein the means for populating comprises a schema mapper.

16. The apparatus of claim 15, wherein the datastore persistent object is uniquely associated with a schema mapper.

17. The apparatus of claim 15, wherein the schema mapper stores information concerning the external non-object-oriented datastore selected from a group comprising file names, database names, segment names, and field names.

18. The apparatus of claim 15, wherein the schema mapper translates queries to specific instructions for a datastore manager for the external non-object-oriented datastore, wherein the instructions are selected from a group comprising a select instruction, an insert instruction, an update instruction, and a delete instruction.

19. A program storage medium readable by a computer having a memory, the medium tangibly embodying one or more programs of instructions executable by the computer to perform method steps for interfacing queryable datastore persistent objects to non-relational, non-object-oriented datastores, the method comprising the steps of:

receiving a request to access a datastore persistent object stored in a memory of a computer;

retrieving a logical unit of data from an external non-object-oriented datastore stored on a data storage device attached to a computer in response to the request; and populating the datastore persistent object with the logical unit of data retrieved from the external non-object-oriented datastore, so that the logical unit of data is encapsulated within the datastore persistent object in the memory of the computer.

20. The method of claim 19, wherein the populating step comprises the step of translating common elements between the logical unit of data retrieved from the external non-object-oriented datastore and the datastore persistent object.

21. The method of claim 19, further comprising the step of updating the external non-object-oriented datastore when the logical unit of data encapsulated by the datastore persistent object is modified.

22. The method of claim 19, further comprising the step of inserting the logical unit of data encapsulated within the datastore persistent object into the external non-object-oriented datastore.

23. The method of claim 19, further comprising the step of deleting the logical unit of data from the external non-object-oriented datastore when the datastore persistent object is deleted from the memory of the computer.

24. The method of claim 19, wherein the populating step is performed by a schema mapper.

25. The method of claim 24, wherein the datastore persistent object is uniquely associated with a schema mapper.

26. The method of claim 24, wherein the schema mapper stores information concerning the external non-object-oriented datastore selected from a group comprising file names, database names, segment names, and field names.

27. The method of claim 24, wherein the schema mapper translates queries to specific instructions for a datastore manager for the external non-object-oriented datastore, wherein the instructions are selected from a group comprising a select instruction, an insert instruction, an update instruction, and a delete instruction.

* * * * *

UNITED STATES PATENT AND TRADEMARK OFFICE
CERTIFICATE OF CORRECTION

PATENT NO. : 5,761,671

DATED : June 2, 1998

INVENTOR(S) : Kenneth R. Blackman, et al

It is certified that error appears in the above-identified patent and that said Letters Patent is hereby corrected as shown below:

Column 4, line 9, after "such" insert --as--.

Column 7, line 23, change DPO's to --DPOs--.

Signed and Sealed this

Ninth Day of February, 1999

Attest:

Attesting Officer

Acting Commissioner of Patents and Trademarks

UNITED STATES PATENT AND TRADEMARK OFFICE
CERTIFICATE OF CORRECTION

PATENT NO. : 5,761,671　　　　　　　　　　　　PAGE 1 of 2

DATED : June 2, 1998

INVENTOR(S) : Kenneth R. Blackman, et al.

It is certified that error appears in the above-identified patent and that said Letters Patent is hereby corrected as shown below:

On title page,

In the Title:

[54] METHOD FOR INTERFACING QUERYABLE DATESTORE PERSISTENT OBJECTS TO NON-RELATIONAL, NON-OBJECT-ORIENTED DATASTORES should read:

[54] METHOD FOR INTERFACING QUERYABLE DATASTORE PERSISTENT OBJECTS TO NON-RELATIONAL, NON-OBJECT-ORIENTED DATASTORES

Column 1:

Lines 1-4:

METHOD FOR INTERFACING QUERYABLE DATESTORE PERSISTENT OBJECTS TO NON-RELATIONAL, NON-OBJECT-ORIENTED DATASTORES

UNITED STATES PATENT AND TRADEMARK OFFICE
CERTIFICATE OF CORRECTION

PATENT NO.  : 5,761,671

DATED       : June 2, 1998

INVENTOR(S) : Kenneth R. Blackman, et al.

It is certified that error appears in the above-indentified patent and that said Letters Patent is hereby corrected as shown below:

should read:

METHOD FOR INTERFACING QUERYABLE
DATASTORE PERSISTENT OBJECTS TO
NON-RELATIONAL, NON-OBJECT-
ORIENTED DATASTORES

Signed and Sealed this

Second Day of November, 1999

Attest:

Q. TODD DICKINSON

*Attesting Officer*    Acting Commissioner of Patents and Trademarks